Crosby & Kellogg.
Woven Fabric.

No. 2,188 Reissued Mar. 6, 1866.

Witnesses,
L. L. Peck
C. M. Shelton

Inventors,
C. J. Crosby
Henry Kellogg

N. PETERS, PHOTO-LITHOGRAPHER, WASHINGTON, D. C.

UNITED STATES PATENT OFFICE.

THE ELM CITY COMPANY, OF NEW HAVEN, CONNECTICUT, ASSIGNEES OF C. O. CROSBY AND HENRY KELLOGG.

IMPROVEMENT IN MANUFACTURE OF TAPE TRIMMINGS.

Specification forming part of Letters Patent No. 36,454, dated September 16, 1862; Reissue No. 2,188, dated March 6, 1866.

*To all whom it may concern:*

Be it known that C. O. CROSBY and HENRY KELLOGG, of New Haven, in the county of New Haven and State of Connecticut, did invent a new and useful Improved Manufacture of Tape Trimmings; and we do hereby declare the following, when taken in connection with the accompanying drawings and the letters of reference marked thereon, to be a full, clear, and exact description of the same, and which said drawings constitute part of this specification and represent a short piece of finished trimming, with the left-hand point in different stages of progression, fold by fold, so as to exhibit the manner in which the point is made.

This article is useful for ornamenting, and at the same time preserving, the edges of garments, pillow-cases, &c., upon which it is to be sewed after it is made.

A tape trimming of a different character and construction has been long in ordinary use, made of tape so folded as to present a succession of points and with the folds secured by hand-stitching. This old trimming was made by hand, and the folds were held in place as made by sewing the folds down upon each other and at the meeting edges, or some of them with hand-stitches, the lines of stitching being short and in various directions.

Our tape trimming can be most conveniently made by a machine invented by us, for which Letters Patent were issued to said Crosby and Kellogg, dated August 5, 1862, and this machine holds the fold in place until secured by a continuous line or lines of stitches.

Figure 1:
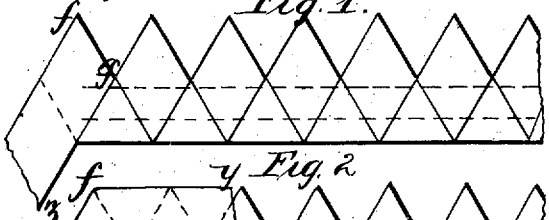
Figure 2:
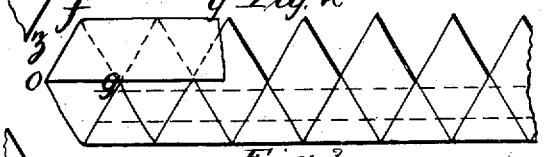
Figure 3:
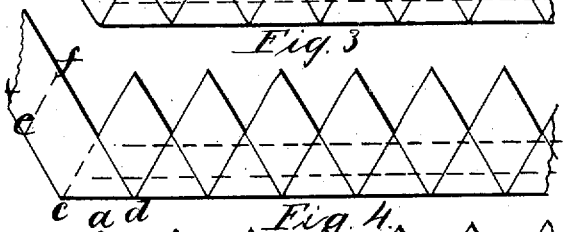
Figure 4:
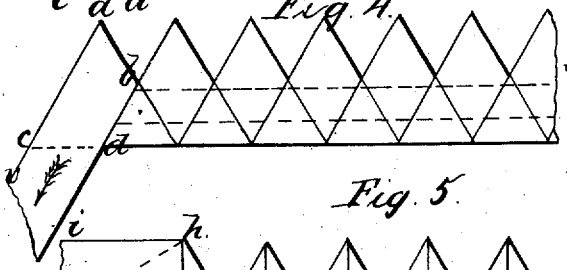
Figure 5:
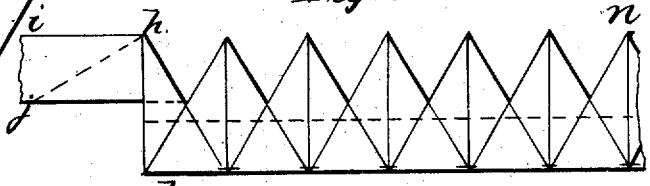
Figure 6:
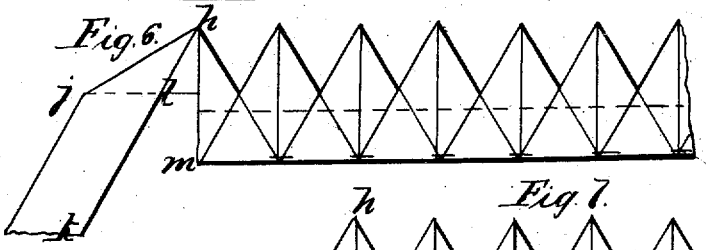
Figure 7:
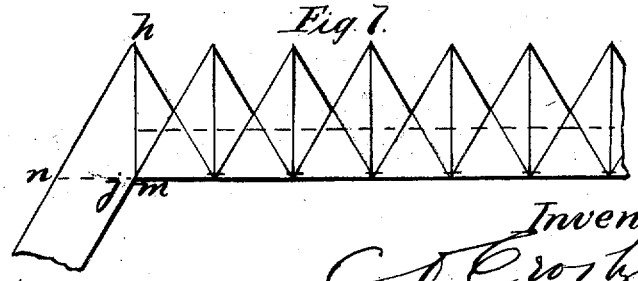
Figure 8:
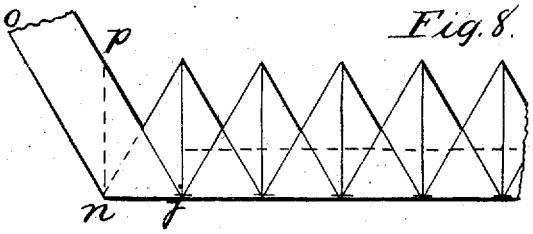
Figure 9:
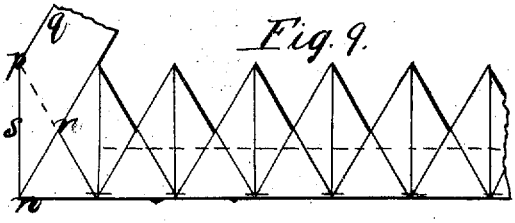
Figure 10:
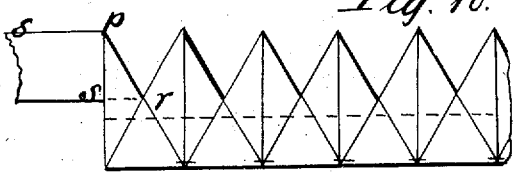
Figure 11:
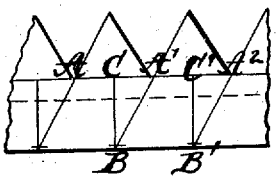

The trimming is made as follows: A piece of tape is taken extending in any suitable length from the line *a b*, Figure 4. The tape is then bent on the line *c d*, Figs. 3 and 4, till it lies flat down upon itself, assuming the direction *c x*. It is then bent and folded flat again on the line *e f*, Figs. 2 and 3, assuming the direction *f y*. It is then bent and folded again in the line *f g*, Figs. 2 and 1, so as to take the direction *g z*, the tape being now in a line parallel to *a v*, Fig. 4, and one point being completed. The tape is now folded again on a prolongation of the line *c d*, and the steps before described are repeated, so as to make a continuous line of points, as shown in all the figures. These points as made are secured in place by a continuous line or lines of stitching made by a sewing-machine, these lines taking the direction indicated by the red lines, and it will be observed that these stitches are in a continuous straight line, or nearly so, not uniting the edges of folds or tacking down each fold as made, but seaming right along and through the folds in a line parallel to the straight edge of the trimming, or nearly so. In practice we prefer to run a single line of seaming through the folds as made, and parallel with the red lines, such stitching being loose and easily raveled out, and then to resew the article with one or more lines of firm seam, as indicated by the red lines, and afterward ravel out the first made seam; but the first seam may be made a firm one and remain in the finished article.

We sometimes intend to make the fold as shown in Figs. 5 to 11 inclusive. These figures represent the formation of the fold at the left-hand end. Tape is to be laid in the direction *h i*, Fig. 5, and folded flat on the line *j h*, Figs. 5 and 6, assuming the direction *h k*. The double part *j h l* is then folded in the line *h l* until the line *j h* coincides with *h m*. The tape is then again folded on the line *j n*, Figs. 7 and 8, taking the direction *n o*, and is again folded on *n p*, Figs. 8 and 9, taking the direction *p q*. It is next folded on the line *p r*, Figs. 9 and 10, assuming the direction *p s*, which is parallel.

All the folds, except the last, are made on top of the prior fold; but the last fold on the line *p r* is folded underneath the part of the preceding fold bounded by the triangle *p r s*. These folds are then repeated so as to make the article in Figs. 5 to 11, inclusive, Fig. 11 being a plan of the article on the side opposite to that shown in the other figures. The folds are secured by a continuous line of seaming, as indicated by red lines, or by several lines parallel therewith. Other dispositions of the folds or systems of folding have been devised by us, but they all in common with those represented in the drawings have one characteristic—namely, a series of points made of two or more thicknesses of tape produced by folding a length of tape upon itself. The article may also be made of braid or thick ribbon or other narrow fabrics.

By securing the folds in place by lines of continuous seaming running along the length of the finished article several advantages are secured. In the first place the goods are more cheaply made; secondly, they are much stronger than when made on the old plan, the continuous line or lines of seaming running across all the folds holding them firmly in place and making the article very strong lengthwise; thirdly, there is no necessity of fastening the ends of short seams or letting the thread be loose on the surface of the article where it extended from the end of one seam to the commencement of the next.

In the old-fashioned article of tape trimming there was no continuous seam longer than the width of the finished trimming, and usually not longer than half that width, the folds being usually tacked at A, and a loose thread carried from A to B. A seam was then made from B to C, then a loose thread to A′, where the folds were again tacked, and from thence a loose thread, as before, to B′, and so on in succession.

We do not claim folded tape not sewed together, or folded tape with the folds secured by tacking or short seams; but What we do claim as the invention of the said C. O. CROSBY and HENRY KELLOGG, as an improved article of manufacture, is—

The finished tape trimming constituted and made substantially as herein described.

C. O. CROSBY,
*President.*
SAML. E. BARNEY,
*Secretary.*
*Elm City Company, assignees of C. O. Crosby and Henry Kellogg.*

Witnesses:
JOHN E. EARLE,
JOHN H. SHUMWAY.